UNITED STATES PATENT OFFICE.

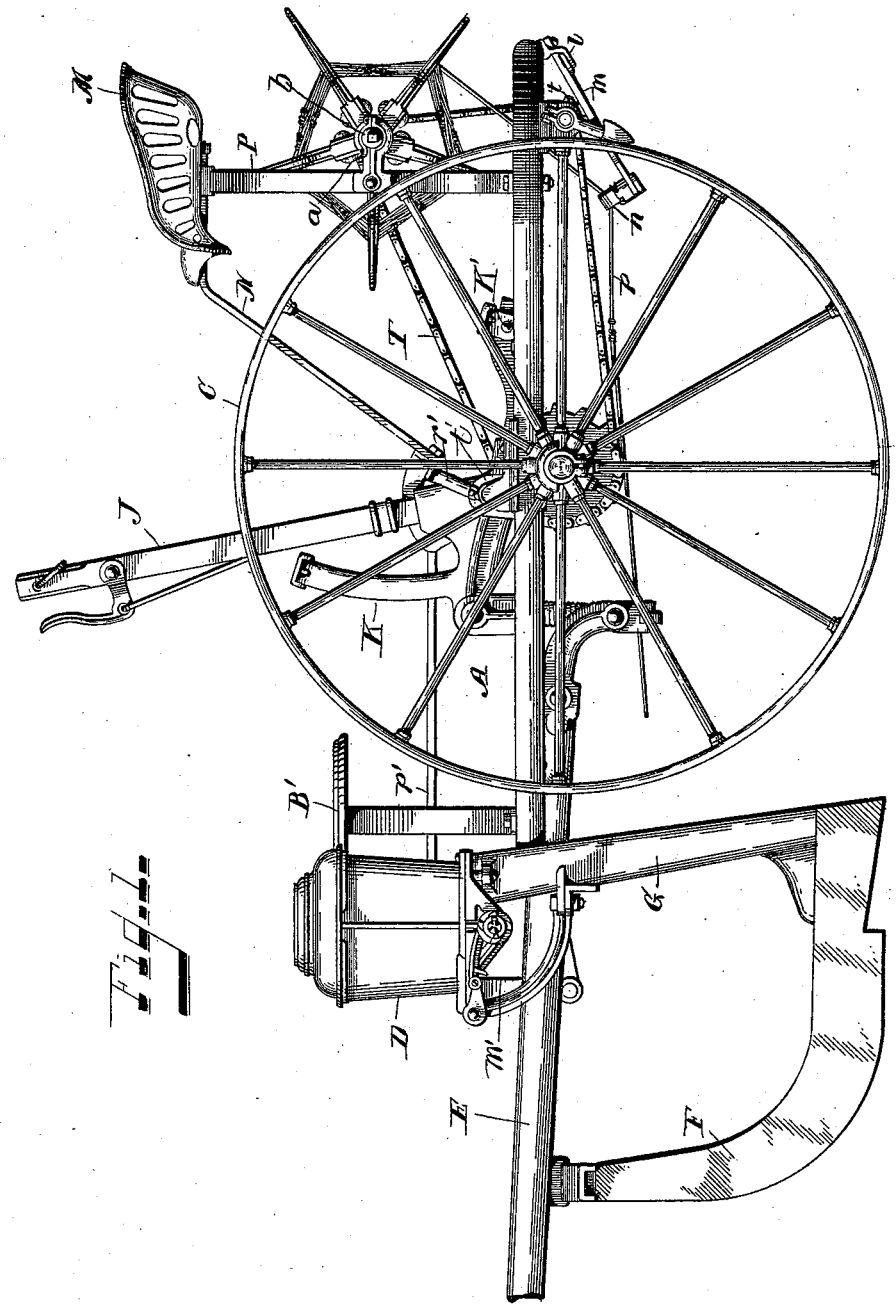

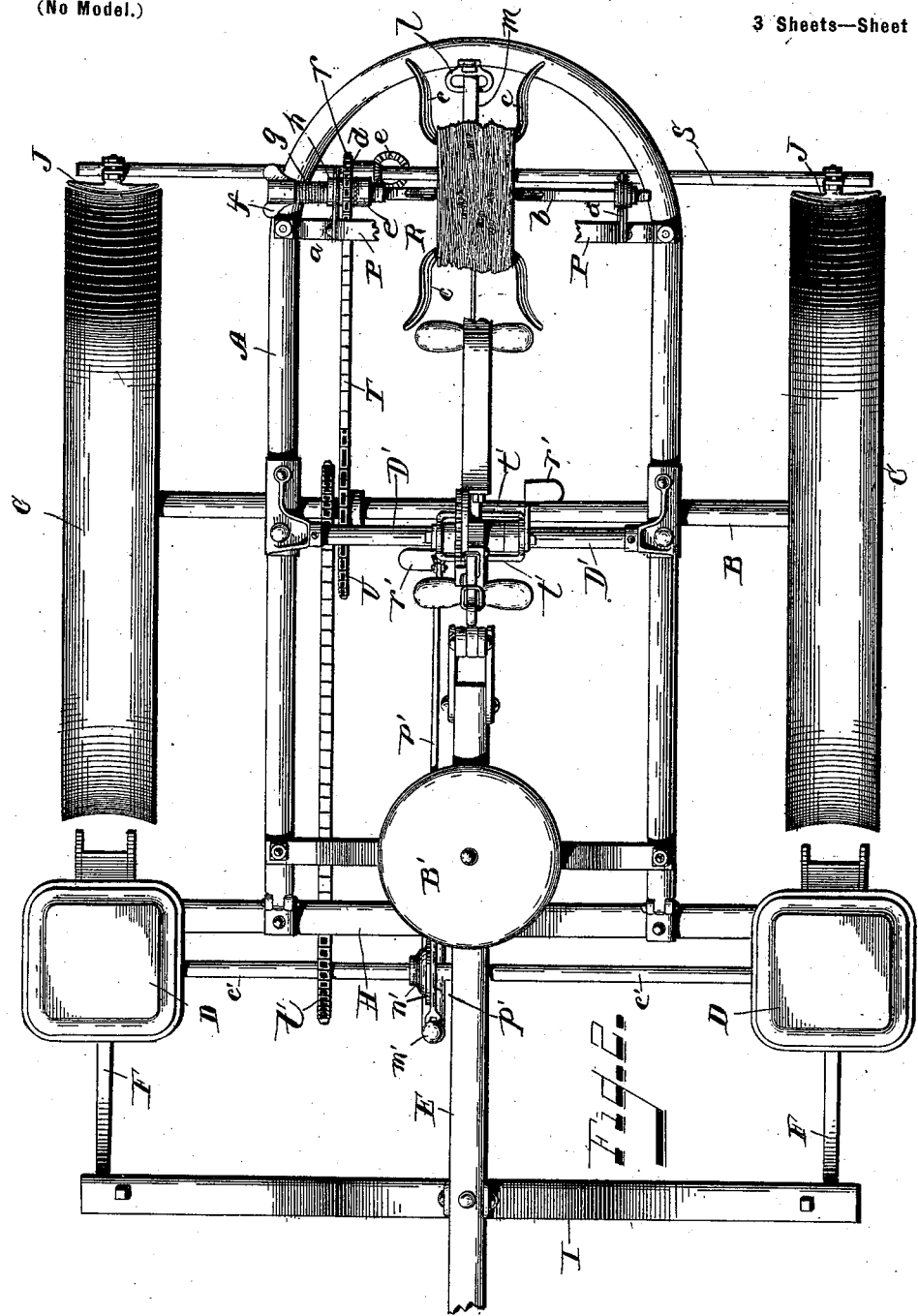

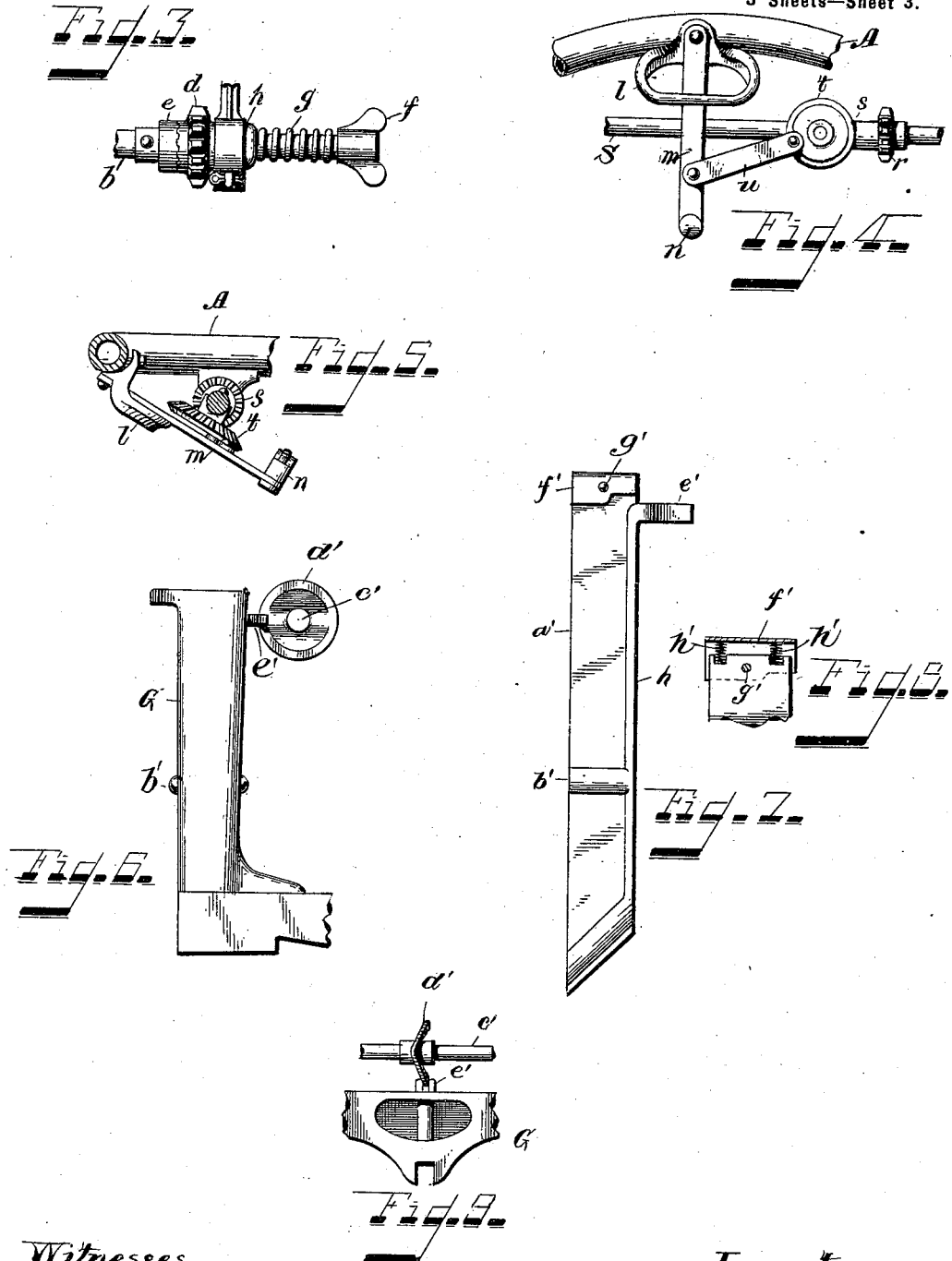

FRANK K. LATHROP, OF DAYTON, OHIO, ASSIGNOR TO THE OHIO RAKE COMPANY, OF SAME PLACE.

CORN-PLANTER.

SPECIFICATION forming part of Letters Patent No. 613,929, dated November 8, 1898.

Application filed January 21, 1898. Serial No. 667,426. (No model.)

*To all whom it may concern:*

Be it known that I, FRANK K. LATHROP, a citizen of the United States, residing in Dayton, in the county of Montgomery and State of Ohio, have invented certain new and useful Improvements in Corn-Planters, of which the following is a full, clear, and exact description, reference being had to the accompanying drawings, forming part of this specification.

My improvements relate to machines for planting corn and the like in which the corn is fed automatically at predetermined intervals by check-row attachment operated by wire or cord stretched across the field to be planted.

The first part of my improvements relates to an automatic rewinding-reel for taking up the wire or cord after the rows have been planted.

The second part of my invention relates to a simple and effective device to prevent the corn as it is fed from the hopper to the conducting-tubes from being cut and ground as it enters the conducting-tube.

These and other features of novelty in construction and operation will be hereinafter more particularly pointed out and claimed.

In the drawings, Figure 1 is a side elevation of the corn-planter. Fig. 2 is a top plan view of same. Figs. 3, 4, and 5 are detail views of the reel-rewinding mechanism. Figs. 6, 7, 8, and 9 are detail views of one of the conducting-tubes, illustrating the attachment to prevent the grinding of the corn as it enters the conducting-tube.

The check-row attachment and mechanism for operating same and the feed mechanism for the corn-hoppers are not shown in the drawings, as these features form no part of the present invention.

A is the main frame of the implement, on which is mounted in the usual way the carrying-axle B, provided with the usual carrying and covering wheels C. D D are the corn-hoppers, suitably mounted on the cross-bar H, pivoted to the main frame in the usual way. E is the draft-pole, carrying the cross-bar I, to which are pivoted the runners F F, carrying the conducting-tubes G G. The runners are raised from the ground when not in use by the hand-lever J or the double-acting foot-lever K K', pivoted on the shaft D', connected by the usual connecting pressure device with the inner end of the draft-pole E, so that the runners are driven into the ground by spring-pressure when the operating-levers are depressed and are raised from the ground for the transporting of the implement when the levers are moved in the other direction. These features are not, however, shown in detail, as the various constructions are old and well known.

M is the driver's seat, supported in front by the bar N and by the spring-bar P, bolted to the rear of the main frame at each side. Secured to this seat spring-bar P at a suitable distance below the seat are the arms $a\ a$, on the outer ends of which is mounted the shaft $b$, which carries at its central portion the winding-reel R, upon the forked arms $c\ c$ of which the check-row wire or cord is rewound.

Mounted loosely just within the supporting-arm $a$ is the sprocket-wheel $d$, the hub of which is ribbed and meshes with the collar $e$, correspondingly ribbed and keyed to the shaft $b$. The outer end of the shaft $b$ is provided with a thumb-nut $f$, while the coiled spring $g$ bears between this nut and the collar $h$, mounted on the shaft $b$ and bearing against the supporting-arm $a$. The tension of this spring $g$ causes a friction-clutch between the fixed collar $e$ on the reel-shaft $b$ and the sprocket-wheel $d$, the friction-clutch being provided for a purpose to be hereinafter described.

Bolted to the rear of the frame A is the bracket $l$, to which is pivoted the bar $m$, carrying at its inner end the loop $n$, through which the check-row wire $p$ passes.

S is the scraper-rod, carrying the scrapers $j\ j$ for the covering-wheels. Mounted loosely on this rod in the same vertical plane with the sprocket-wheel $d$ is the sprocket-wheel $r$, carrying at its one side the beveled gear $s$, which meshes with the gear $t$ at right angles thereto, which gear is mounted on a stud secured to the scraper-rod $s$.

$u$ is a connecting-bar or pitman coupled between a stud on the gear $t$ and the bar $m$, so that the rotation of the gear $t$ will cause the bar $m$ and with it the loop-carrier $n$ to reciprocate, and thus carry the wire from side to side to cause it to wind up evenly on the reel. Instead of bolting the bracket $l$ to the main frame, however, it may be secured to any fixed part or it may be secured on the scraper-rod, as may be most convenient.

The two sprocket-wheels $d$ $r$ are driven by the sprocket-chain T, which gets its motion from the sprocket-wheel U, mounted on the carrying-axle B of the planter. Inasmuch as the sprocket-wheel $d$ is thus driven at a constant rate of speed it is essential as the amount of wire increases on the reel that the reel should slip in order to prevent the tension from breaking the wire, and for this reason the friction-clutch is arranged, as hereinbefore described, between the sprocket-wheel $d$ and the reel-shaft $b$. In order to regulate the tension properly and prevent jarring and noise, the friction-faces between the sprocket and collar $e$ are not the ordinary ratchet-teeth, but are ribbed and grooved, as shown in Fig. 3. When the proper tension is had by adjusting the thumb-nut $f$, this arrangement allows the reel to slip readily and without noise or jar.

Each conducting-tube G for the corn-hoppers is provided with partition $a'$, pivoted at $b'$, to divide the conducting-tube into two compartments. Mounted on the driving-shaft $c'$, carrying the driving-gear for the feed mechanism, is the cam $d'$, the edge of which engages with the lug $e'$ on this partition-plate, so that as the shaft $c'$ is rotated by sprocket-gear $l'$, geared with the carrying-axle, the partition is shifted from side to side, closing the conducting-tube at the bottom for one of the compartments and opening it for the other. The cam $d'$ is so arranged with relation to the feed mechanism of the corn-hopper that the corn fed to the tube will drop first into the closed compartment, while at the next feeding operation the lower end of the compartment will be open and allow the corn to be deposited in the ground. This is the usual construction in machines of this class; but with the shifting of the partition-plate $a'$, especially where the feed mechanism is arranged to deliver two or three grains of corn at a time, it frequently happens that the grains are caught between the feed-hopper and the pressure-plate and ground up by the movement, especially since in order to insure a proper delivery the upper end of the partition must be arranged to hug up closely the base-plate of the corn-hopper. In order, therefore, to prevent this grinding or catching of the grains of corn, I provide the upper end of the partition-plate $a'$ with a cap or extension piece $f'$, pivoted at $g'$ to the upper end of the plate. Should any grains of corn catch on the upper edge of the partition, the cap $f'$ will be depressed and prevent the destruction of the seed, while one of the coiled springs $h'$ will return the cap to its normal position, whichever side of the cap is depressed.

It frequently happens that the usual check-row attachment cannot be conveniently used at the ends of fields and in other inconvenient places, and for that reason a seat B' is provided for an assistant, who operates the lever $m'$, carrying pawls which engage a ratchet-wheel $n'$, mounted on the feed-shaft $c'$. The ratchet-wheel $n'$ is keyed to the feed-shaft $c'$, and the pawls are coupled to the hand-lever $m'$ by links and held by spring-pressure against the teeth on the ratchet in the well-known mechanical way to obtain a continuous-feed movement for the feed-shaft as the hand-lever is shifted by the assistant in either direction. The details of this construction are not shown, however, as the method of obtaining such continuous-feed motion is old and well known. In order to dispense with an assistant, however, when there is only need for a small amount of corn to be fed, this lever $m'$ is connected, by connecting-rod $p'$, with one of a pair of foot-levers $r'$ $r'$, which are united by a casting $t'$, mounted so as to oscillate on the shaft D'. By pressing first on one foot-lever $r'$ and then on the other the driver can thus operate the lever $m'$ without leaving his seat.

Having thus described my invention, what I claim, and desire to secure by Letters Patent, is—

1. In a corn-planter, the combination, with the main axle and driving-sprocket mounted thereon of two shafts with sprockets loosely mounted thereon, the one carrying a friction-clutch, the other a beveled gear, reel for rewinding the check-row wire mounted on one of said shafts, with friction-clutch between same and its respective sprocket, beveled gear mounted on the other shaft meshing with its respective sprocket, arm for delivering the wire pivoted to oscillate, with pitman connection with said beveled gear, substantially as shown and described.

2. In a corn-planter, a conducting-tube for the corn-hopper, with partition pivoted therein dividing the same into two compartments, and means for oscillating said partition to alternately open and close said compartments at the bottom, and a cap-plate, pivoted to the partition at the top forming an extension therefor and adapted to oscillate to allow any grains of corn caught thereunder to pass without destruction, substantially as shown and described.

3. In a corn-planter, the combination, with a rewinding-reel and means for driving same, of a friction-clutch therefor, consisting of a ribbed and grooved collar fixed to the driving-gear, and a movable collar correspondingly ribbed and grooved meshing therewith, and spring to hold same together, substantially as shown and described.

4. In a corn-planter, the combination, with the corn-hoppers, and feed-shaft for the feed mechanism, with ratchet and pawl for rotating said feed-shaft by hand, of a shaft, and a casting pivoted thereon, provided with a pair of foot-treadles located on opposite sides of said pivot, and a rod connecting one of said treadles with the operating-pawl for said feed-shaft ratchet, whereby said pawl may be operated in opposite directions by the foot action of the driver to actuate said feed mechanism, substantially as shown and described.

FRANK K. LATHROP.

Witnesses:
W. H. H. ECKI,
E. J. FINKE.